United States Patent
Raymond

(10) Patent No.: US 6,697,462 B2
(45) Date of Patent: Feb. 24, 2004

(54) SYSTEM AND METHOD FOR DISCOURAGING COMMUNICATIONS CONSIDERED UNDESIRABLE BY RECIPIENTS

(75) Inventor: Philip R. Raymond, Marlborough, MA (US)

(73) Assignee: Vanguish, Inc., Marlborough, MA (US)

( * ) Notice: Subject to any disclaimer, the term of this patent is extended or adjusted under 35 U.S.C. 154(b) by 0 days.

(21) Appl. No.: 10/120,058

(22) Filed: Apr. 10, 2002

(65) Prior Publication Data
US 2003/0086543 A1 May 8, 2003

Related U.S. Application Data

(60) Provisional application No. 60/347,857, filed on Nov. 7, 2001.

(51) Int. Cl.[7] .............................................. H04M 11/00
(52) U.S. Cl. ................................ 379/93.02; 379/93.24; 379/100.09
(58) Field of Search ........................... 379/93.02, 93.24, 379/100.08, 114.14, 100.04, 100.09, 100.03, 93.03; 709/203, 206, 219, 238, 245; 705/39

(56) References Cited

U.S. PATENT DOCUMENTS

| | | | | |
|---|---|---|---|---|
| 5,828,737 A | * | 10/1998 | Sawyer | 379/114.07 |
| 5,999,967 A | * | 12/1999 | Sundsted | 709/206 |
| 6,192,114 B1 | * | 2/2001 | Council | 379/93.24 |
| 6,209,095 B1 | * | 3/2001 | Anderson et al. | 713/176 |
| 2003/0023736 A1 | * | 1/2003 | Abkemeier | 709/229 |

* cited by examiner

Primary Examiner—Melur Ramakrishnaiah
(74) Attorney, Agent, or Firm—Gregory P. Gadson

(57) ABSTRACT

A system and methods for discouraging unwanted electronic communications requires a communication sender who is not recognized by the intended recipient, or who is not approved by the intended recipient, to a post a bond to accompany the communication. Adaptable to eliminating spam, unwanted faxes, unwanted telephone calls, etc., the system and method forces the money associated with the bond to be forfeited if the communication is rejected or deemed undesirable by the recipient. To prevent financially motivated abuse on the part of recipients, the preferred embodiment forfeits the bond money in favor of a third party such as a charity or governmental entity, to which the recipient has no legal obligation. A further safeguard against recipient abuse gives senders a predetermined number of unsolicited communications to send to system subscribers, after which bonds are required to send unapproved communications.

9 Claims, 2 Drawing Sheets

Figure 1:
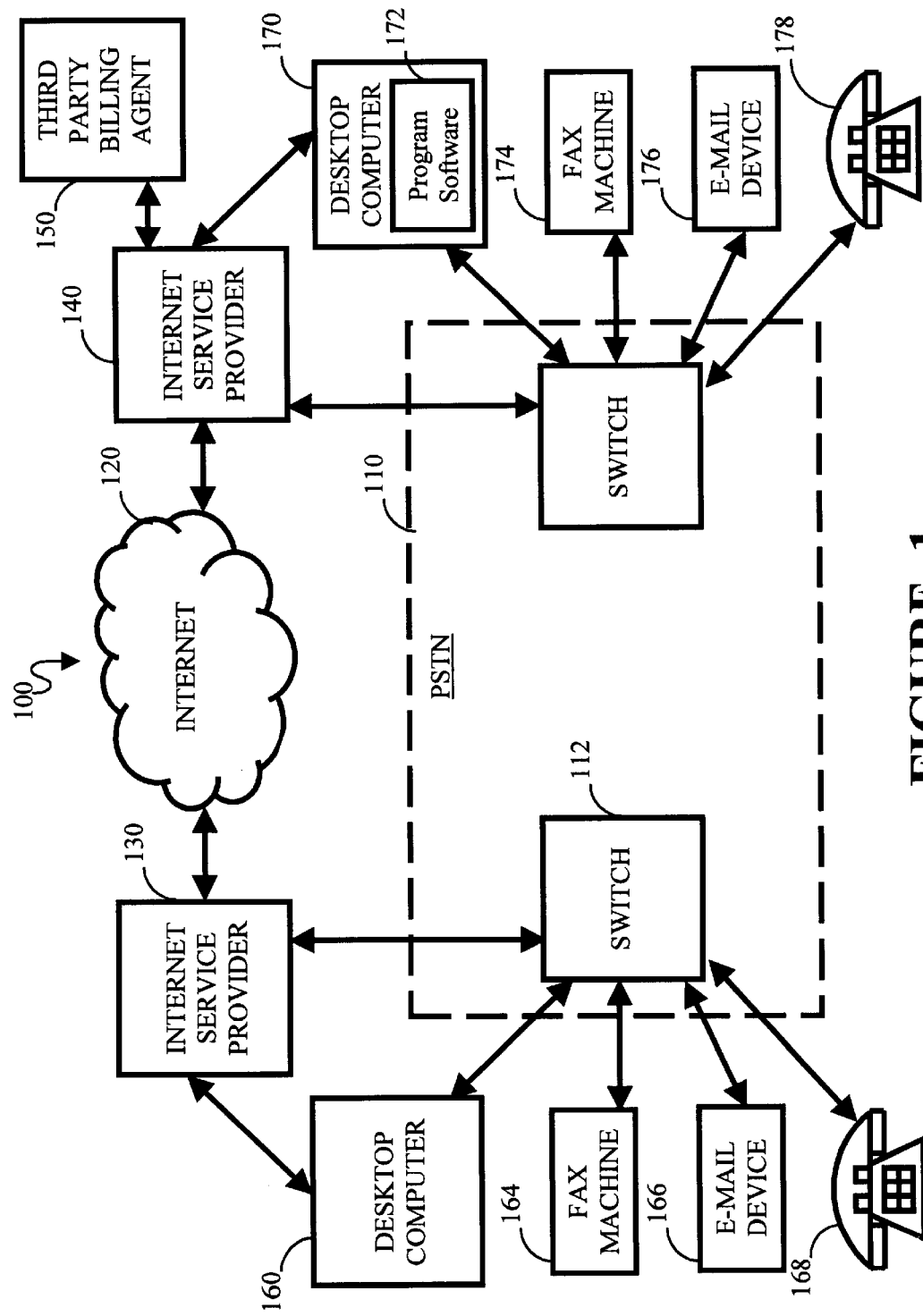

SYSTEM AND METHOD FOR DISCOURAGING COMMUNICATIONS CONSIDERED UNDESIRABLE BY RECIPIENTS

CROSS-REFERENCE TO RELATED APPLICATIONS

This application is based on and claims the priority of U.S. Provisional Patent Application Serial No. 60/347,857, filed Nov. 7, 2001 for "System and Method for Discouraging Unwanted Electronically Based Communications."

BACKGROUND OF THE INVENTION

1. Field of the Invention

The present invention generally relates to methods for reducing unwanted electronic communications, with a non-limited emphasis upon "spam" and other forms of unwanted electronic mail.

2. Background

As is well known, electronic mail ("e-mail") messages can be sent and received from almost any location using a computer or other device with a MODEM and an available telephone line. At the time of the initial filing of the application upon which this Letters Patent is based, well over 300 million hourly e-mail messages, and approximately 3 trillion yearly e-mail messages, were being sent to computer users.

To the chagrin of many e-mail users, much of the messages and attached files they receive can be classified as "spam." In general, spam is unsolicited, mass-transmitted e-mail analogous to "junk" mail received by postal customers. Unlike postal junk mailers, "spammers" have very little increased cost associated with sending mass e-mailings, and are exponentially wreaking havoc.

Not only does spam overwhelm users' system resources and commandeer their time in order to delete unwanted messages, but it also transmits undesirable subject matter for many users. The undesirable subject matter for some, ranges from unwanted commercial solicitation, to chain mailings, to sexually explicit material.

One simplistic prior art approach to solving the problem of eliminating unwanted e-mail messages is for the user to compile a list of acceptable senders' e-mail addresses, or a list of banned senders' addresses, or both. Software on the user's computer system would then reject all incoming e-mail which is from a banned source, or which is from an unauthorized source. This approach has several problems; among them, rejecting perfectly legitimate e-mails the user would indeed have an interest in, simply because the sender's address does not appear on the list of authorized senders. This approach also places an untenable burden upon the user to constantly update the aforementioned list in order to avoid improper rejections. This approach also lacks the ability to recognize desirable senders whose e-mail addresses have changed unbeknownst to the recipient.

Another approach to eliminating unwanted e-mail messages is to install a filter on the user's system, or at the level of the Internet Service Provider (ISP) administering the user's e-mail account. Prior to presenting an e-mail message to the user, the filter peruses the e-mail for words or character strings that have been identified as tending to be associated with an undesirable communication. Regardless of how sophisticated these filters are, they often reject perfectly legitimate e-mail messages for failure to place the forbidden words in context. These filters also fail to reject undesirable messages that are cleverly worded to appear innocuous to filters, but yet contain subject matter the user would not otherwise like to receive.

In yet another approach, the user employs a third party to administer a filtering service for screening all e-mail messages. All e-mail sent to a service subscriber's address is routed to a server or other instrumentality under the control of the filter service operator. The filtering service combines software and human screeners to review all messages, and pass to the subscriber, only those messages meeting the subscriber's positive and/or negative criteria. This approach adds extra cost to e-mail service, and while it may eliminate more of the cleverly worded but yet undesirable messages, nonetheless suffers from the same software limitations as previously mentioned approaches. It is also prone to human error. Compounding these problems is a loss of privacy on the part of the subscriber, as well as a requirement that the subscriber relinquish a degree of control to third parties who lack to personal experience and information to accept those messages which may appear forbidden on the surface, but might actually be desirable for receipt nonetheless.

A newer approach advocated, but yet to be successfully implemented commercially, is to charge an e-mail sender a fee for every message he or she sends. This is designed to make the price of spamming cost-prohibitive, while not leading to raised costs for typical e-mail users. While this can be controlled by ISPs who service the spammers, it will not discourage spammers whose ISPs do not charge for individual mail. Further, this moves away from the concept of e-mail for the masses which is not encumbered by a fee or taxing event for every message. It also requires those who send a large number of legitimate, desirable e-mails that are not seen as a nuisance, to pay unacceptably high up-front fees.

A further proposed refinement of the latter approach requires e-mail users to install special software that automatically assesses a fee (payable to the user) for each e-mail message from an unrecognized sender. The fee can be collected via the Internet Service Provider (ISP) where the sender and recipient have a common ISP. If not, the multiple ISPs involved can cooperate to charge the fee. If the user determines that the e-mail was desirable, he or she can cancel the charge. The fee is a matter of design choice, and can be, for example, in the $1 to $3 range.

While the latter approach may indeed serve as a deterrent to sending spam, it includes facets that make it impractical. Automatically and randomly charging senders having addresses unknown to the recipient, without their knowledge that they could be charged does not permit e-mail senders to adequately plan their costs associated with sending e-mails. Further, there is a financial incentive for some recipients to abuse the system by not canceling fees for legitimate e-mails, simply to collect the fee.

It should be noted that the problems associated with e-mail and unwanted messages are also present with other forms of electronic communication, such as, for example, telephone calls and facsimile transmissions. Solutions to reducing unwanted messages and contact for these other forms of communication are also inadequate.

SUMMARY OF THE INVENTION

In view of the aforementioned problems and deficiencies of the prior art, the present invention provides a method of regulating electronic communications. The method at least includes the steps of receiving a communication from a sender for a designated recipient, comparing sender identity indicia attached to the communication with stored sender identity indicia in a database under the control of the recipient, and presenting the communication to the recipient for acceptance or rejection, when the sender identity indicia is determined to be acceptable. The method further at least includes the steps of sending a return message to the sender indicating that a bond must be posted when the sender identity indicia is not determined to be acceptable, and that money associated with the bond shall be forfeited if the communication is presented to the recipient and the recipient rejects the communication, dissolving the bond when the recipient accepts the communication, and causing the money associated with the bond to be forfeited when the recipient rejects the communication.

The present invention also provides a system for regulating electronic communications. The system includes, inter alia, at least a communication server adapted to receive a communication from a sender for a designated recipient, a sender identity indicia database adapted to store sender identity indicia under the direction of the recipient corresponding to acceptable or unacceptable sender identities, a comparator adapted to compare sender identity indicia attached to the communication with stored sender identity indicia database, and a bond establisher adapted to enable communication senders to establish bonds. The communication server is further adapted to present the communication to the recipient for acceptance or rejection, when the sender identity indicia is determined to be acceptable according to the output and interpretation of the comparator, and send a return message to the sender indicating that a bond must be posted when the sender identity indicia is not determined to be acceptable, and that money associated with the bond shall be forfeited if the communication is presented to the recipient and the recipient rejects the communication. The system is also adapted to dissolve the bond when the recipient accepts the communication, and cause the money associated with the bond to be forfeited when the recipient rejects the communication.

The present invention further provides a method of regulating electronic communications that at least includes the steps of receiving a communication from a sender for a designated recipient, and if the communication is accompanied by a posted bond, the amount of which is specified by the recipient, the recipient providing a guarantee that the communication will be accepted.

BRIEF DESCRIPTION OF THE DRAWING FIGURES

Figure 2:
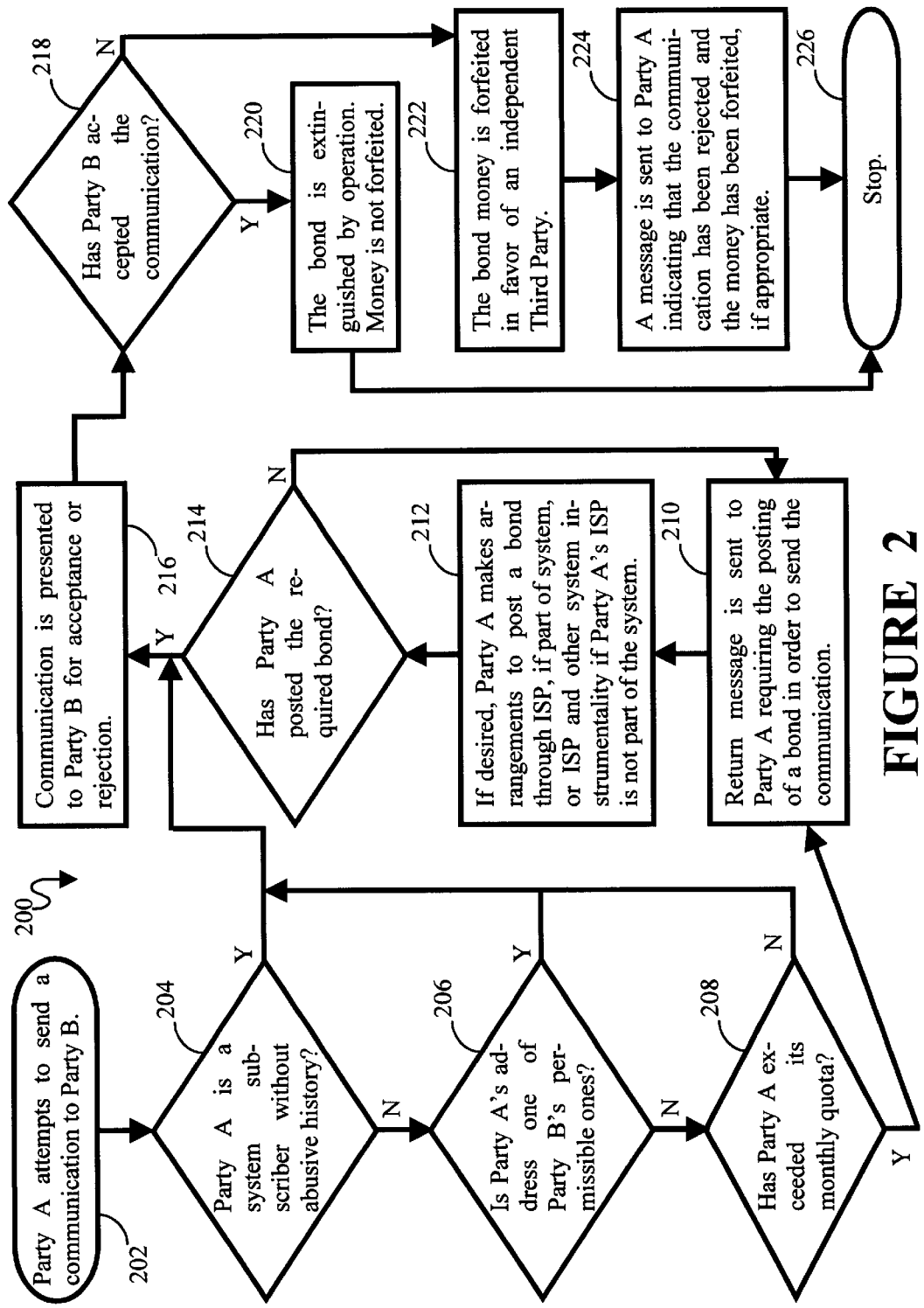

Features and advantages of the present invention will become apparent to those skilled in the art from the description below, with reference to the following drawing figures, in which:

FIG. 1 is a schematic block diagram of the present-inventive communication system for regulating communications between communication senders and communication recipients according to the present invention; and FIG. 2 is a flow chart of the process of generating and sending electronic communications according to the present invention.

DESCRIPTION OF THE PREFERRED EMBODIMENTS

General System

A general schematic block diagram of the present-inventive communication regulation system 100 is shown in FIG. 1. In the system 100, users can both send and receive a variety of electronic communications from a variety of sources, such as from computers (160, 170), facsimile machines (164, 174), special purpose hardware like electronic mail (e-mail) devices, or EMDs (166, 176), and conventional telephones (168, 178). Those skilled in the art to which the invention pertains will appreciate that other devices and other forms of communication can be regulated by the system without departing from the scope of the present invention. Further examples of these communications include "pop-up" menus and third party content messages received while a user is logged on to the Internet. Also, the devices can be connected to the system by both wired and wireless means.

In the preferred embodiment, the system 100 includes a Public Switched Telephone Network (PSTN) 110 for processing telephonic communications emanating from within and without the network. The details of a functioning PSTN are well known to those skilled in the art, and will thus not be repeated here, except to symbolically show telephonic switches 112 and 114. The present invention functions whether the communication is contained entirely within the PSTN, or whether there is extra-network handling. In an alternate embodiment, the connection to the PSTN may be by-passed entirely in favor of a cable modem connection, for communication between the ISP and the desktop computer.

Such extra-network handling includes communications which are transmitted and received through a wide area network (WAN) 120 such as the Internet. Connection to the Internet 120 is by way of one or more Internet Service Providers (ISPs) such as the ones 130 and 140.

A third party billing agent 150 handles financial transactions relating to credit cards and the like.

Users subscribing to the present inventive system and communication regulation service will have program software 172 installed in their computers for receipt of computer communications. Where the user receives a communication without a computer, the program software can be installed as part of the switches 112, 114, and/or as part of an Intelligent Network.

The methods associated with the present invention, as described below, can be carried out by one or more communication servers under the control of the system ISPs, with each ISP having a separate server, or one or more centralized system servers.

General Method

At its core, the present invention requires a communication sender who is not recognized or authorized by a communication recipient to establish a bond (e.g., liability bond) or other legal vehicle to protect the recipient against undesirable communications. Those having legal training will appreciate that arrangements other than bonds will suffice, provided the sender pledges money which will be forfeited upon the occurrence of a contingency. The contingency in this case is the communication recipient's rejection of the communication, whether a knee-jerk rejection, or whether the rejection occurs after the recipient considers the communication content.

With the above-mentioned approach, those indiscriminately sending large numbers of spam or other communications must weigh the benefits of sending communications to system subscribers who require them to post bonds, and thus risk forfeiting money if the communication is rejected. The amount of money associated with the bond can be predetermined by the system (for example, two dollars for each communication), or set by the recipient in an alternate embodiment.

The algorithm 200 in FIG. 2 generally describes the basic steps employed by the present-inventive system for discouraging unwanted electronic communications.

The algorithm begins at Step 202 when a person or entity ("Party A") attempts to send an electronic communication to another person or entity ("Party B") who is a subscriber to a present-inventive system. If Party A is also a subscriber to the system, and does not have a record of abuse (i.e., has not habitually sent unwelcome or undesirable communications to other system subscribers), the algorithm advances from Step 204 to Stem 216, where the communication is presented to Party B for acceptance or rejection.

If Party A is not both a subscriber and one with a non-abusive record, the algorithm moves from Step 204 to Step 206. Either locally or at the communication server, Party A's address is compared with stored addresses in Party B's database. Party B's stored address list can include only those addresses indicated by Party B that should be allowed to communicate with Party B without posting a bond. Party B may also instruct the database that certain identified senders (via the senders' address) should not be able to send communications even if they post a bond. Party B can then periodically update the database to include new banned senders, or expand or revise the list of acceptable senders' addresses. In an alternate embodiment, Party B can have his or her database automatically updated by the system administrator. In that case, the system administrator adds to all subscriber databases, those senders (to be banned from bonded communication) who qualify as "spammers."

If Party A's address is a permissible one, the algorithm bypasses Steps 208 through 214, and presents the communication to Party A in Step 216. If Party A's address is not a permissible one, the preferred embodiment determines whether Party A has exceeded its quota for sending communications which have been rejected by subscriber recipients. The inclusion of a quota allows those who are truly not spammers (or other indiscriminate communicators like telemarketers or "nuisance faxers"—those who tie up facsimile machines with unsolicited facsimile transmissions) to send a certain amount of legitimate communications to people who do not happen to recognize them by their address, without having to post a bond. The exact quota is a matter of design choice, but could be, for example, 50 rejected communications per month. The ISPs can even charge different access fees for each subscriber depending on the number of non-bonded communications the subscriber can have in each month or other time period. In an alternative approach, exceeding the quota changes the bond money needed from a specified lower amount to a specified higher amount.

If Party A has not exceeded its quota, a bond will not be required. However, if the quota has been exceeded, a return message is sent to Party A (in Step 210) indicating that the communication will not be sent to Party B unless Party A posts a specified bond. In Step 212, Party A posts the requisite bond, vel non, through its ISP by account, using a credit card and interfacing with the third party billing agent 150 mentioned supra, or other means.

If Party A has posted the requisite bond, the communication is presented to Party B for acceptance or rejection (Steps 214 and 216). If Party A has not posted the requisite bond, the communication is automatically rejected and the algorithm returns to Step 210.

Once the bond has been posted, and the communication has been sent, the algorithm determines whether Party B has accepted or rejected the communication. If Party B accepts the communication (or indicates that it is desirable once the communication is reviewed) the bond is extinguished, and the money is returned or credited back to Party A's account (Steps 218 and 220). If Party B rejects the communication (or indicates that it is undesirable after it is reviewed) the bond money is forfeited in favor of a third party, and then an explanatory message is sent to Party A (Steps 218, 222 and 224). After Step 224, the algorithm stops in Step 226. To prevent financially motivated abuse on the part of recipients, the preferred embodiment forfeits the bond money in favor of a third party such as a charity or governmental entity (such as the Internal Revenue Service), to which the recipient has no legal obligation. The subscriber has the option of designating which third party or third parties will receive forfeited bond money.

It should be noted that whether used in the specification or the claims of this Letters Patent, "acceptance" or "rejection" of a communication by a recipient is at the recipient's unfettered discretion. That is, the recipient may choose to reject communications that comport with or contravene articulated criteria. Or, a recipient may change the criteria without warning, without articulated justification, and on the fly, even rejecting communications of the type previously accepted. Or, a recipient need not articulate criteria at all. Additionally, "acceptance" or "rejection" of a received communication need not be in real time, but may occur after some delay in receipt to allow the recipient to ponder whether a communication is desirable, acceptable, etc. In fact, an alternative system may be implemented so that a recipient may reject communications that were received in a previous communication sessions.

Some Specific Variations

Variations and modifications of the present invention are possible, given the above description. However, all variations and modifications which are obvious to those skilled in the art to which the present invention pertains are considered to be within the scope of the protection granted by this Letters Patent.

One variation on the methods described above allows communication senders to purchase a guarantee that their communications will be reviewed and genuinely considered by highly sought after individuals and entities. For example, if an individual wishes to pitch a business proposition to a busy corporate chieftain, celebrity or governmental official, the individual can post a specified bond (e.g., fifty thousand dollars) for a specified amount of communication time (e.g., twenty minutes) with the targeted person. Using this approach, the busy, perpetually wooed individual can ensure that only the most serious-minded, determined individuals actually attempt to reach them. The money pledged under this approach is then forfeited upon the targeted individual or entity actually making, reviewing and considering the communication, regardless of whether or not the communication is later determined to be desirable. In order to avoid the appearance that the highly sought after individual is merely trying to generate self-income, the money pledged can be paid to a charity or other third party independent of the individual. Pledges made to governmental officials must obviously meet ethical guidelines, and avoid the appearance of "influence peddling."

Another variation of the present invention allows subscribers to indicate that they will receive all communications from specified commercial senders for a period of time, regardless of the nature of the communications. In exchange for the subscriber giving up his or her privilege to receive nuisance-free communications under the system, the subscriber might be paid a flat fee or periodic fees.

It is also possible to implement the present-inventive system using a clearinghouse-like entity/instrumentality, rather than placing all of the control under the ISPs. The clearinghouse can also serve as a dispute resolution entity, where subscribers can lodge complaints against other subscribers that may be abusing a "non-spam generator" presumption. It may also be used by subscribers to complain that other subscribers are simply rejecting legitimate communications to generate income, even though the income from the forfeited bonds may not go directly to the communication recipients.

What is claimed is:

1. A method of regulating electronic communications, said method comprising:
   a) receiving a communication from a sender for a designated recipient;
   b) comparing sender identity indicia attached to said communication with stored sender identity indicia in a database under the control of said recipient;
   c) presenting said communication to said recipient for acceptance or rejection, when said sender identity indicia are determined to be acceptable in step b);
   d) sending a return message to said sender indicating that a bond must be posted when said sender identity indicia are not determined to be acceptable in step b), and that money associated with said bond shall be forfeited if said communication is presented to said recipient and said recipient rejects said communication;
   e) dissolving said bond when said recipient accepts said communication;
   f) causing the money associated with said bond to be forfeited when said recipient rejects said communication;
   g) for each sender encountered by the system administering said method, counting the number of communications by the sender which are rejected by a recipient; and
   h) disabling step f) when the number of rejected communications by system users has not exceeded a predetermined number.

2. The method of claim 1, further comprising:
   i) disabling step h; and
   j) increasing the amount of money required for said bond when the number of rejected communications by system users has exceeded a predetermined number.

3. A method of regulating electronic communications, said method comprising:
   a) receiving a communication from a sender for a designated recipient;
   b) comparing sender identity indicia attached to said communication with stored sender identity indicia in a database under the control of said recipient;
   c) presenting said communication to said recipient for acceptance or rejection, when said sender identity indicia is determined to be acceptable in step b);
   d) sending a return message to said sender indicating that a bond must be posted when said sender identity indicia is not determined to be acceptable in step b), and that money associated with said bond shall be forfeited if said communication is presented to said recipient and said recipient rejects said communication;
   e) dissolving said bond when said recipient accepts said communication;
   f) causing the money associated with said bond to be forfeited when said recipient rejects said communication;
   disabling steps d) through f) when the sender is a subscriber to a system administering said method; and
   banning a subscriber from said system if said subscriber sends more than a predetermined number of unsolicited communications to other subscribers.

4. A method of regulating electronic communications, said method comprising:
   a) receiving a communication from a sender for a designated recipient;
   b) comparing sender identity indicia attached to said communication with stored sender identity indicia in a database under the control of said recipient;
   c) presenting said communication to said recipient for acceptance or rejection, when said sender identity indicia are determined to be acceptable in step b);
   d) sending a return message to said sender indicating that a bond must be posted when said sender identity indicia are not determined to be acceptable in step b), and that money associated with said bond shall be forfeited if said communication is presented to said recipient and said recipient rejects said communication;
   e) dissolving said bond when said recipient accepts said communication;
   f) causing the money associated with said bond to be forfeited when said recipient rejects said communication;
   g) enabling a recipient to declare himself/herself willing to receive commercial communications from senders approved by the system administering said method; and
   h) disabling steps d) through f) for approved senders.

5. A system for regulating electronic communications, said system comprising:
   at least a communication server adapted to receive a communication from a sender for a designated recipient;
   a sender identity indicia database adapted to store sender identity indicia under the direction of the recipient corresponding to acceptable or unacceptable sender identities;
   a comparator adapted to compare sender identity indicia attached to said communication with stored sender identity indicia database;
   said communication server being further adapted to present said communication to said recipient for acceptance or rejection, when said sender identity indicia are determined to be acceptable according to the output and interpretation of said comparator;
   said communication server being further adapted to send a return message to said sender indicating that a bond must be posted when said sender identity indicia are not determined to be acceptable, and that money associated with said bond shall be forfeited if said communication is presented to said recipient and said recipient rejects said communication;
   a bond establisher adapted to enable communication senders to establish bonds; and
   a counter adapted to, for each sender encountered by said system, counting the number of communications by the sender which are rejected by a recipient;
   wherein said system is adapted to dissolve said bond when said recipient accepts said communication, said system is adapted to cause the money associated with said bond to be forfeited when said recipient rejects said communication, and said system is further adapted to forego forfeiting the money associated with said bond when the number of rejected communications by system users has not exceeded a predetermined number.

6. The system of claim 5, further comprising:

wherein said system is not adapted to forego forfeiting the money associated with said bond when the number of rejected communications by system users has not exceeded a predetermined number, and said bond establisher is further adapted to increase the amount of money required for said bond when the number of rejected communications by system users has exceeded a predetermined number.

7. A system for regulating electronic communications, said system comprising:

at least a communication server adapted to receive a communication from a sender for a designated recipient;

a sender identity indicia database adapted to store sender identity indicia under the direction of the recipient corresponding to acceptable or unacceptable sender identities;

a comparator adapted to compare sender identity indicia attached to said communication with stored sender identity indicia database;

said communication server being further adapted to present said communication to said recipient for acceptance or rejection, when said sender identity indicia are determined to be acceptable according to the output and interpretation of said comparator;

said communication server being further adapted to send a return message to said sender indicating that a bond must be posted when said sender identity indicia are not determined to be acceptable, and that money associated with said bond shall be forfeited if said communication is presented to said recipient and said recipient rejects said communication;

a bond establisher adapted to enable communication senders to establish bonds; and a system administrator adapted to ban a subscriber from said system if said subscriber sends more than a predetermined number of unsolicited communications to other subscribers;

wherein said system is adapted to dissolve said bond when said recipient accepts said communication, and said system is adapted to cause the money associated with said bond to be forfeited when said recipient rejects said communication, and wherein said communication server is adapted to forego sending said return message, and said system is further adapted to forego forfeiting the money associated with said bond when the sender is a subscriber to a system administering said method.

8. A system for regulating electronic communications, said system comprising:

at least a communication server adapted to receive a communication from a sender for a designated recipient;

a sender identity indicia database adapted to store sender identity indicia under the direction of the recipient corresponding to acceptable or unacceptable sender identities;

a comparator adapted to compare sender identity indicia attached to said communication with stored sender identity indicia database;

said communication server being further adapted to present said communication to said recipient for acceptance or rejection, when said sender identity indicia are determined to be acceptable according to the output and interpretation of said comparator;

said communication server being further adapted to send a return message to said sender indicating that a bond must be posted when said sender identity indicia are not determined to be acceptable, and that money associated with said bond shall be forfeited if said communication is presented to said recipient and said recipient rejects said communication; and a bond establisher adapted to enable communication senders to establish bonds;

wherein said system is adapted to dissolve said bond when said recipient accepts said communication, and said system is adapted to cause the money associated with said bond to be forfeited when said recipient rejects said communication; and wherein said system is further adapted to enable a recipient to declare himself/herself willing to receive commercial communications from senders approved by the system, said communication server is adapted to forego sending said return message, and said system is further adapted to forego forfeiting the money associated with said bond for approved senders.

9. The system of claim 8, wherein said system if further adapted to pay a recipient who agrees to receive said commercial communications a fee from said sender.

* * * * *

UNITED STATES PATENT AND TRADEMARK OFFICE
CERTIFICATE OF CORRECTION

PATENT NO. : 6,697,462 B2
DATED : February 24, 2004
INVENTOR(S) : Philip R. Raymond It is certified that error appears in the above-identified patent and that said Letters Patent is hereby corrected as shown below:

<u>Title page,</u>
Item [73], Assignee, change the name to -- Vanquish, Inc. --

Signed and Sealed this

First Day of June, 2004

JON W. DUDAS
*Acting Director of the United States Patent and Trademark Office*